(12) United States Patent
Masamura et al.

(10) Patent No.: US 6,499,572 B2
(45) Date of Patent: Dec. 31, 2002

(54) DAMPING FORCE GENERATOR

(75) Inventors: Tatsuya Masamura, Tokyo (JP); Kenji Kitamura, Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/813,322

(22) Filed: Mar. 21, 2001

(65) Prior Publication Data

US 2001/0042664 A1 Nov. 22, 2001

Related U.S. Application Data

(63) Continuation-in-part of application No. 09/155,653, filed as application No. PCT/JP97/01218 on Apr. 9, 1997, now abandoned.

(30) Foreign Application Priority Data

Apr. 10, 1996 (JP) ............................................. 8-114101

(51) Int. Cl.$^7$ .................................................. F16F 9/34
(52) U.S. Cl. .................................................. 188/282.1
(58) Field of Search ....................... 188/322.15, 322.14, 188/322.22, 315, 281, 282.6, 282.5; 132/493.8

(56) References Cited

U.S. PATENT DOCUMENTS

| | | | |
|---|---|---|---|
| 2,732,039 A | 1/1956 | Funkhouser et al. | |
| 3,874,487 A | 4/1975 | Keijzer et al. | 188/322 |
| 4,610,332 A | 9/1986 | Mourray | |
| 4,905,799 A | 3/1990 | Yamaoka et al. | 188/322.15 |
| 5,085,300 A | 2/1992 | Kato et al. | 188/322.15 |
| 5,115,892 A | 5/1992 | Yamaoka et al. | 188/282 |
| 5,823,306 A | 10/1998 | de Molina | 188/322.15 |

FOREIGN PATENT DOCUMENTS

| | | |
|---|---|---|
| DE | 1979961 U | 2/1968 |
| GB | 2226620 A | 7/1990 |
| JP | 56-122845 | 9/1981 |
| JP | 60132143 | 7/1985 |
| JP | 62-8446 | 1/1987 |
| JP | 63-178646 | 11/1988 |
| JP | 01-111840 | 7/1989 |
| JP | 02-93136 | 4/1990 |
| JP | 03-140644 | 6/1991 |
| JP | 03163234 | 7/1991 |
| JP | 09210111 | 8/1997 |
| WO | WO 92/16769 | 10/1992 |

Primary Examiner—Jack Lavinder
Assistant Examiner—C. T. Bartz
(74) Attorney, Agent, or Firm—Rabin & Berdo, PC

(57) ABSTRACT

In a damping force generator for a hydraulic damper, the valve is protected from pressure rise in the damper and its durability is thereby enhanced. The damping force characteristics can be vary in stepwise fashion by providing a main leaf valve 21 and a sub-leaf valve which closes an opening 21A formed in the main leaf valve 21, and the approximate mid-point of the main leaf valve 21 is supported by a plurality of intermediate seat surfaces 16 from the side of a port 13. The outer circumference of a main leaf valve 64 is supported by an outer circumferential seat surface 62, and the outer circumference of a sub-leaf valve 65 extends outwards to the vicinity of a part where the outer circumference of the main leaf valve 64 and the outer circumferential seat surface 62 overlap.

4 Claims, 13 Drawing Sheets

DAMPING FORCE GENERATOR

This is a continuation-in-part of Ser. No. 09/155,653, filed Sep. 10, 1998, now abandoned which is a 371 of PCT/JP97/01218 filed Apr. 9, 1997.

FIELD OF THE INVENTION

This invention relates to an improvement of a damping force generator in a hydraulic damper used for an automobile suspension or the like.

BACKGROUND OF THE INVENTION

Conventional damping force generators for hydraulic dampers used in an automobile suspension are, for example, disclosed in Tokkai Hei 1-111840 or Tokkai Hei 2-93136.

FIG. 11 and FIG. 12 show a damping force generator in a hydraulic damper disclosed in Tokkai Hei 1-111840.

As shown in FIG. 11, this hydraulic damper comprises an outer tube 1 and an inner tube 2 coaxially housed in the outer tube 1. A piston 3 is housed in the inner tube 2. The interior of the inner tube 2 is divided by this piston 3 into an oil chamber 8 on the rod side and an oil chamber 9 on the piston side, each of these oil chambers being filled with a hydraulic fluid. A tank chamber 10 is formed between the outer circumference of the inner tube 2 and the inner circumference of the outer tube 1, this tank chamber 10 being filled with the hydraulic fluid and air.

The piston 3 is penetrated with a plurality of outer throughholes 11 and inner throughholes 12. A check valve 19 provided at the upper end of the outer throughholes 11 is pushed open when a piston rod 4 connected to the piston 3 moves in the compression direction, and hydraulic fluid flows from the oil chamber 9 to the oil chamber 8. On the other hand, when the piston rod 4 moves in the extension direction, a piston valve 20 provided at the lower end of the inner throughholes 12 is pushed open, hydraulic fluid flows from the oil chamber 8 on the rod side to the oil chamber 9 on the piston side, and an extension damping force is generated due to resistance to this flow.

A base valve unit 15 is mounted at the lower end of the inner tube 2. When the piston rod 4 moves in the compression direction, hydraulic fluid having a volume equivalent to that of the piston rod 4 inside the inner tube 2 flows into the tank chamber 10 and is absorbed. This hydraulic fluid flows via a base valve 15A in the base valve unit 15, and the base valve 15 A generates a compression damping force due to this flow.

As shown in FIG. 12, the piston valve 20 comprises a main leaf valve 21 and a sub-leaf valve 22 which are laminated on each other such that the damping force can be varied in two steps. Describing this in further detail, the main leaf valve 21 has an outer circumferential edge portion which is brought in contact with a seat surface 16 so as to seal a port 17 of the inner throughholes 12 formed in a base 3A of the piston 3. The sub-leaf valve 22 is disposed below the main valve 21 and adheres to it, and closes an opening 21A formed in the main leaf valve 21. Hence, when the extension speed of the piston rod 4 is small and the pressure differential between the oil chamber 8 and the oil chamber 9 is small, only the sub-leaf valve 22 is pushed open due to its low bending rigidity. Thus a minute damping force with a good response is generated as an extension damping due to the opening 21A. On the other hand, when the extension speed of the piston rod 4 rises, and the oil pressure in the oil chamber 8 rises, the main leaf valve 21 is pushed open, hydraulic fluid flows between the outer circumferential edge portion of the main leaf valve 21 and the sheet face 16, and increase of the extension damping force is suppressed so that the damping is gradual.

However, in such a damping force generator for a hydraulic damper, when the extension speed of the piston rod is high, the effective diameter of the main valve 21 (diameter of the seat surface 16) must be sufficiently increased and its deformation made easier so that any increase of extension damping force generated by the piston valve 20 is smooth.

However when the piston rod moves in the compression direction and oil pressure acts from the side of the oil chamber 9 on the main leaf valve 21 of which the diameter has been increased in this way, the valve 21 severely bends toward the port 17. This causes a gap to form with the sub-leaf valve 22 so that hydraulic oil flows from the opening 21A, and there is a possibility that fatigue may occur due to increase of bending stress. This problem is particularly evident when back throttling is performed wherein the hydraulic oil flowing through the outer throughholes 11 is throttled so as to generate a part of the compression damping force and the piston rod moves in the compression direction.

This invention, which was conceived in view of the above problems, aims to provide a damping force generator for a hydraulic damper in which the valve that generates damping force is protected from pressure increases inside the damper, and has improved durability and reliability.

DETAILED DESCRIPTION OF THE INVENTION

This invention concerns a damping force generator for a hydraulic damper comprising a main leaf valve and a sub-leaf valve laminated on each other. The sub-leaf valve closes an opening formed in the main leaf valve and has a lower bending rigidity than that of the main leaf valve. Only the sub-leaf valve opens to generate a damping force when an extension/compression speed of a piston rod is low. Conversely, the main leaf valve opens to suppress increase of damping force when the extension/compression speed of the piston rod is high. An intermediate seat surface is further provided which is formed on the same side of a seat surface which supports the edge of the main leaf valve and supports an inner part of the main leaf valve. Hence, even when the main leaf valve, which is closed, is pushed further in the closing direction by an oil pressure generated in the damper due to extension/compression of the piston rod, the central area of the valve which is most easily bent, is supported by the intermediate seat so that it does not bend. The bending stress acting on the valve is therefore small, the valve is not damaged, and no gap is produced between the main leaf valve and sub-leaf valve.

In another form of the invention, the main leaf valve engages with a piston rod passing through the piston, a port of a connecting passage passing through the piston is formed so as to enclose the piston rod on the underside of the piston, the outer circumferential edge portion of the main leaf valve is supported by an annular seat surface formed on the outer circumferential side of this port, and the intermediate seat surface comprises a plurality of arc-shaped seat surfaces disposed in the vicinity of the approximate mid-point between the annular seat surface and the outer circumference of the piston rod.

In another form of the invention, the main leaf valve engages with a piston rod passing through the piston, a port of a connecting passage passing through the piston is formed so as to enclose the piston rod on the underside of the piston, parts supporting the outer circumferential edge portion of the main valve and parts supporting the approximate midpoint of the main leaf valve are formed alternately and continuously in the seat surface supporting the main leaf valve, and the parts supporting the approximate mid-point of the main leaf valve comprise the intermediate seat surface.

In another form of the invention, a damping force generator for a hydraulic damper comprising a main leaf valve and a sub-leaf valve laminated on each other. The sub-leaf valve closes an opening formed in the main leaf valve and has a lower bending rigidity than that of the main leaf valve, only the sub-leaf valve opens to generate a damping force when an extension/compression speed of a piston rod is low, and the main leaf valve opens to suppress increase of damping force when the extension/compression speed of the piston rod is high. The generator further comprises a seat surface supporting the outer circumference of the main leaf valve, and the outer circumference of the sub-leaf valve extends outwards and near to the point where the outer circumference of the main leaf valve and the seat surface overlap. When the main leaf valve, which is closed, is pushed further in the closing direction by an oil pressure generated in the damper due to extension/compression of the piston rod, the sub-leaf valve extends outwards to the vicinity of the outer circumference supported by the seat surface, and since this sub-leaf valve shares the load with the main leaf valve, deformation of the main leaf valve is suppressed. Hence the bending stress acting on the main leaf valve is small, the main leaf valve is not damaged, and no gap is formed between the main leaf valve and sub-leaf valve.

PREFERRED EMBODIMENT OF THE INVENTION

Some embodiments of this invention will now be described in detail with reference to the appended drawings.

Figure 1:
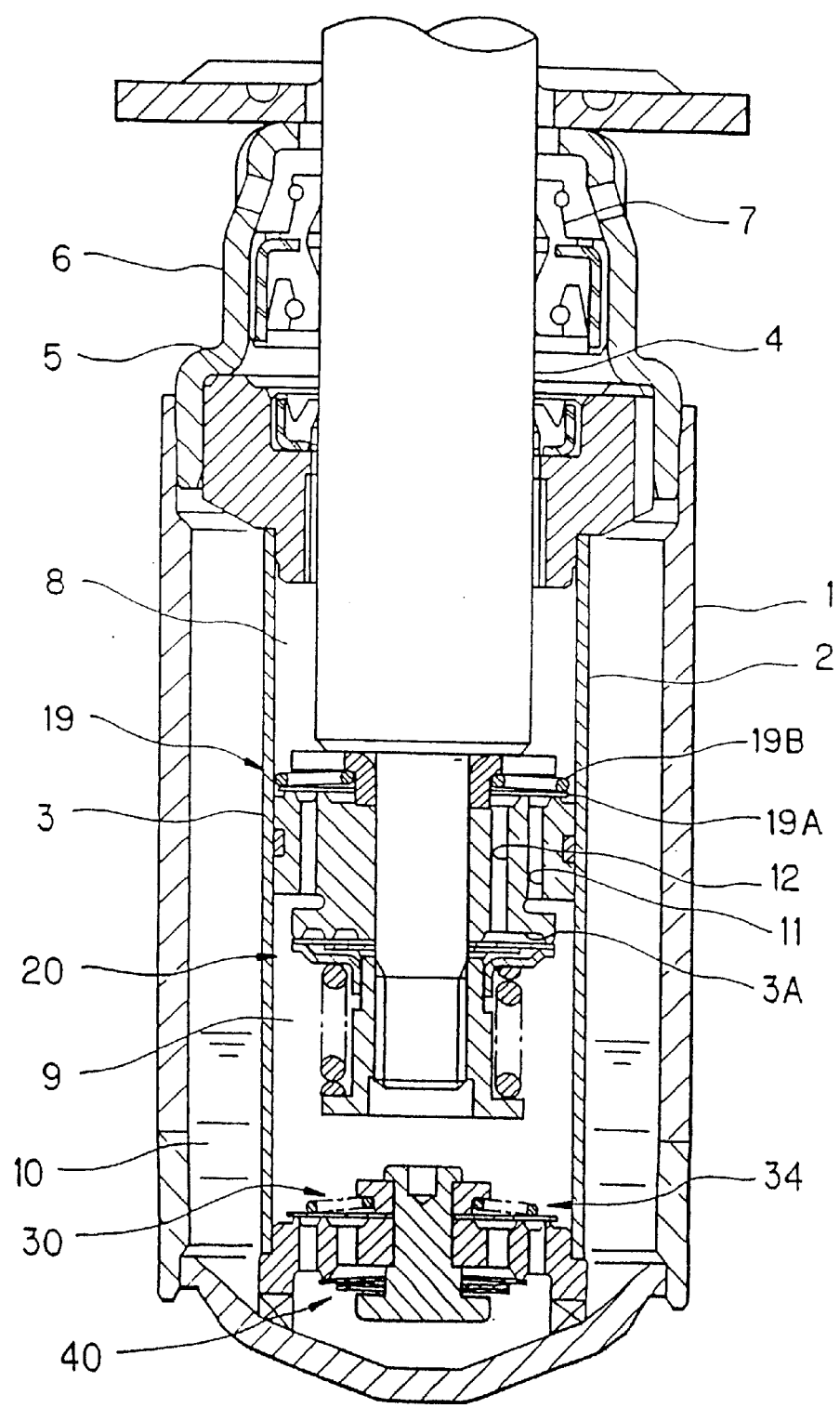
FIG. 1 is a sectional view showing one embodiment of this invention.

As shown in FIG. 1, an inner tube 2 (piston cylinder) is coaxially disposed in an outer tube 1 of a hydraulic damper, and a piston 3 is disposed in the inner tube 2 such that it is free to slide. A piston rod 4 connected to this piston 3, which is guided by a rod guide 5, projects above the inner tube 2. The upper end of the outer tube 1 is closed by a packing case 6 housing the rod guide 5, and is sealed off from the atmosphere by a seal 7.

The interior of the inner tube 2 is divided by the piston 3 into an oil chamber 8 on the side of the piston rod 4, and an oil chamber 9 on the opposite side of the piston rod 4. These oil chambers 8 and 9 are filled with a hydraulic fluid, and are connected via a plurality of outer throughholes 11 and inner throughholes 12 formed in the piston 3. The outer throughholes 11 and inner throughholes 12 are formed on circles having the same center around the center axis of the piston 3, the outer throughholes 11 being disposed on the outside of the inner throughholes 12.

A check valve 19 is provided at the end of the outer throughholes 11 adjacent to the oil chamber 8. This check valve 19 comprises a valve body 19A which closes the throughholes 11, and a spring 19B which pushes the valve body 19A towards the outer throughholes 11. When the piston rod 4 moves in the compression direction, hydraulic fluid is allowed to pass only from the oil chamber 9 on the piston side to the oil chamber 8 on the rod side.

A piston valve 20 is also provided at one end of the inner throughholes adjacent to the oil chamber 9. When the piston rod 4 moves in the extension direction, hydraulic fluid is allowed to flow only from the oil chamber 8 to the oil chamber 9, and the piston valve 20 generates an extension damping force due to resistance to this flow.

A tank chamber 10 is formed between the inner circumference of the outer tube 1 and the outer circumference of the inner tube 2. This tank chamber 10 is connected to the oil chamber 9 via a base valve unit 30 fitted to the lower end of the inner tube 2. As described hereafter, when the piston rod 4 moves in the extension direction, this base valve unit 30 allows hydraulic fluid to pass from the tank chamber 10 to the oil chamber 9 via a check valve 34 without generating a damping force. Conversely, when the piston rod 4 moves in the compression direction, hydraulic fluid is allowed to flow from the oil chamber 9 to the tank chamber 10 via a base valve 42, and a compression damping force is generated due to the resistance to the flow. The tank chamber 10 is filled with hydraulic fluid and air. The volume of the piston rod 4 immersed in the inner tube 2 when the piston rod 4 moves in the compression direction is absorbed by the air in the tank chamber 10.

Next, referring to FIG. 2 of the drawings, the structure of the area where the piston rod 20 is inserted will be described.

As shown in the figure, the piston rod 4 comprises a small diameter part 4A which is formed at the base of the piston rod 4, the piston 3 engaging with the outer circumference of this small diameter part 4A. The part of the piston 3 located further towards the inside than the outer throughholes 11 projects and extends downwards, and comprises a base surface 3A extending outwards. The portion of the small diameter part 4A which projects from the base surface 3A engages with a main leaf valve 21, sub-leaf valve 22 and washer 23 in this order and they are laminated on each other. The inner circumferences of these elements are fixed to the outer circumference of the small diameter part 4A. The piston valve 20 comprises this main leaf valve 21 and sub-leaf valve 22.

A piston nut 24 is screwed to the lower end of the small diameter part 4A underneath the washer 23, and supports the washer 23 from underneath. A spring seat 25 engages with the outer circumference of this piston nut 24. This spring seat 25 is pushed by a spring 26 interposed on a flange 24A at the lower end of the nut, and the outer circumferential edge portion of the main leaf valve 21 is thereby pushed onto an outer circumferential seat surface 14 described hereafter at a contact part 25A of the spring seat 25.

Figure 3:
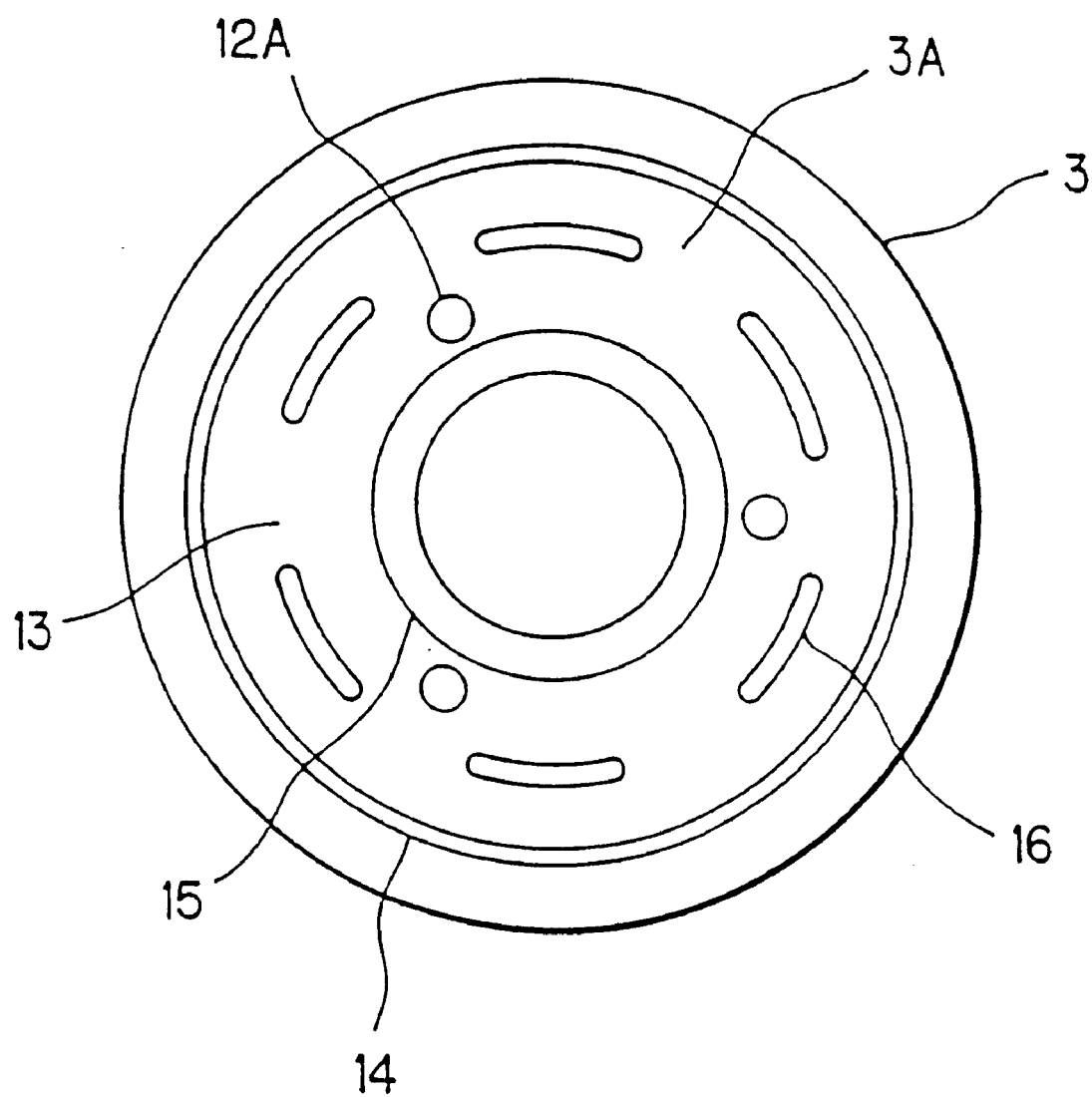
FIG. 3 is a drawing showing a piston base.

A port 13, which is an annular groove, is formed on the base surface 3A of the piston 3 between the outer annular circumferential seat surface 14 and an inner annular circumferential seat surface 15 as shown in FIG. 3. Ends 12A of the plurality of inner throughholes 12 open onto this port 13, and are covered underneath by the main leaf valve 21. The outer circumferential edge portion of the main leaf valve 21 comes in contact with the outer circumferential seat surface 14, and closes the hydraulic oil passage from the inner throughholes 12 to the oil chamber 9.

Further, a plurality of intermediate seat surfaces 16 of identical height to that of the outer circumferential seat surfaces 14 and inner circumferential seat surfaces 15, which comprise a characteristic feature of the invention, are provided at points effectively midway between the outer circumference and inner circumference on a concentric circle with the port 13. In this way, the effective mid-point of the main leaf valve 21 is supported in contact with this plurality of intermediate seat surfaces 16, so the main leaf valve 21 does not bend towards the port 13 even when a high pressure is applied by the oil chamber 9. These surfaces are disposed at a certain interval from each other so that they do not form walls in the port 13 that would obstruct the flow of hydraulic fluid.

Figure 2:
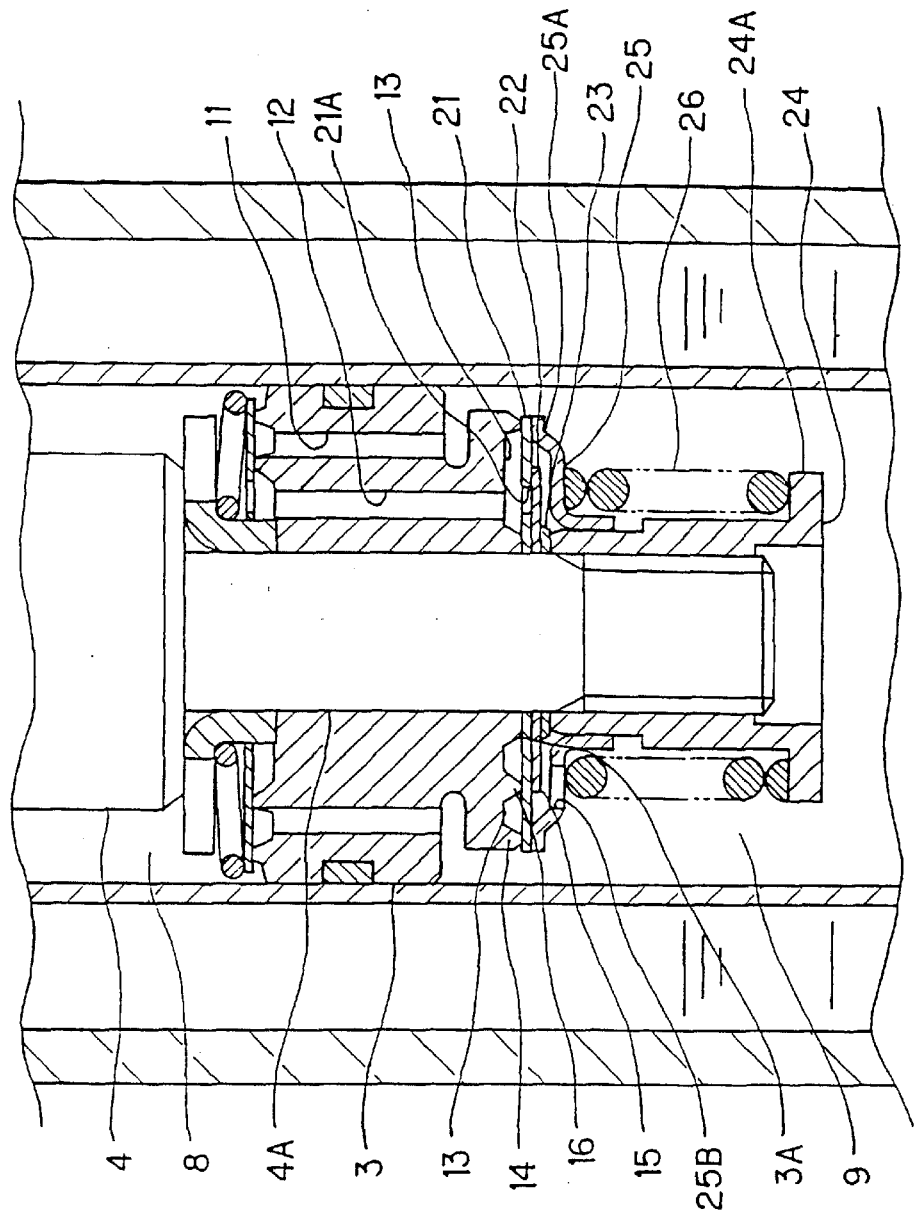
FIG. 2 is a sectional view showing an enlargement of the area around a piston valve.

A plurality of openings 21A are formed in the main leaf valve 21 facing the port 13 as shown in FIG. 2. These openings 21A are closed from underneath by the sub-leaf valve 22.

As the sub-leaf valve 22 has a small bending rigidity, it bends fulcruming about the outer edge of the washer 23 and is pushed open even when the extension speed of the piston rod 4 is very low or low, and the oil pressure generated in the inner throughholes 12 is small. Hydraulic fluid therefore flows through the openings 21A, and also through the plurality of openings 25B formed in the spring seat 25 covering the underneath of the sub-leaf valve 22 so as to flow towards the oil chamber 9. In this case, the resistance to the flow of hydraulic fluid is determined by the deformation characteristics of the sub-leaf valve 22 and the opening area of the openings 21A. A very small damping force with a fast response relative to the extension speed of the piston rod 4 is then generated according to this resistance.

On the other hand, the main leaf valve 21 opens when the extension speed of the piston rod 4 is high, and the pressure differential between the pressure of the oil chamber 8 and the pressure of the oil chamber 9 exceeds a set pressure determined by the deformation characteristics of the main leaf valve 21 and the pushing force of the spring 26. A large amount of hydraulic fluid therefore flows through the gap between the outer circumference seat surface 14 and main leaf valve 21 into the oil chamber 9, hence the increase of damping force is gradual and sudden increases of extension damping force are suppressed. After the main leaf valve 21 has opened, the pressure differential across the openings 21A does not increase any further, hence the damping force due to the sub-leaf valve 22 does not rise beyond this.

Figure 4:
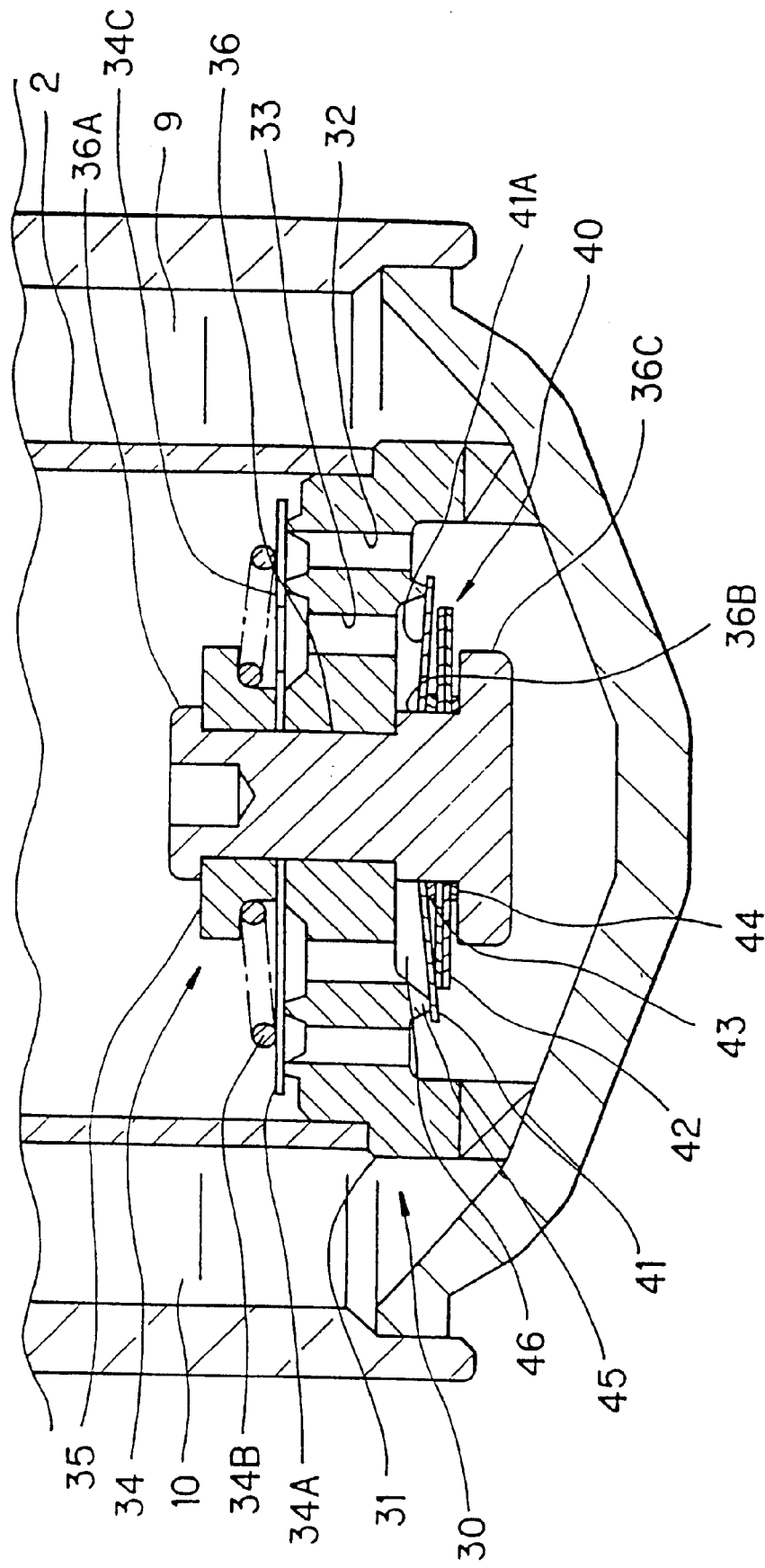
FIG. 4 is a sectional view showing an enlargement of the area around a base valve.

Next, the construction of the base valve unit 30 will be described in detail with reference to FIG. 4.

The base valve unit 30 comprises a valve seat 31 fitted to the underside of the inner tube 2. This valve seat 31 is penetrated by a plurality of outer throughholes 32 and inner throughholes 33, and hydraulic fluid flows through these outer throughholes 32 and inner throughholes 33 between the oil chamber 9 and tank chamber 10. The outer throughholes 32 and inner throughholes 33 are respectively formed on concentric circles with respect to the center axis of the valve seat 31, the outer throughholes 32 being disposed on the outside of the inner throughholes 33.

A leaf-shaped valve body 34A of a check valve 34 is disposed at one end of the outer throughholes 32 adjacent to the oil chamber 9. The valve body 34A is pushed toward the valve seat 31 by a return spring 34B provided between the valve body 34A and a stopper 35. Hence, when the piston rod moves in the extension direction, the check valve permits hydraulic fluid to flow only from the tank chamber 10 to the oil chamber 9. An opening 34C is formed at the position of the inner throughholes 33 in the valve body 34A so as to connect the inner throughholes 33 with the oil chamber 9.

A column-shaped guide 36 also passes substantially through the center of the valve seat 31. The stopper 35 is held between the valve seat 31 and a grip piece 36A at the upper end of the guide 36. A portion 36B of large diameter is provided at the lower end of the guide 36 which projects below the valve seat 31, the upper end of this portion 36B being in contact with the base of the valve seat 31. A base valve 40 comprising a main leaf valve 41 and sub-leaf valve 42 is provided on the outer circumference of the portion 36B.

Describing this in further detail, the main leaf valve 41, a support 43, the sub-leaf valve 42 and a spacer 44 are fitted onto the portion 36B in this order from the base of the valve seat 31, the underside of the spacer 44 being supported by a flange 36C at the end of the portion 36B. The outer circumference of the main leaf valve 41 is in contact with an annular seat surface 45 provided between the outer throughholes 32 and inner throughholes 33 underneath the valve seat 31. A port 46 is formed at the valve seat 31 between the annular seat surface 45 and the outer circumference of the portion 36B, the inner throughholes 33 being connected with this port 46. Hence the main leaf valve 41, which is under a predetermined preload due to the support 43, is in contact with the seat surface 45 and closes the port 46. When the piston rod 4 moves in the compression direction and the pressure of the oil chamber 9 exceeds a set pressure, the valve 41 is pushed open and hydraulic fluid flows out from the gap between the valve 41 and the seat surface 45.

An opening 41A is also formed in this main leaf valve 41, and this opening 41A is closed from underneath by the sub-leaf valve 42. As this sub-leaf valve 42 has a low bending rigidity, it is pushed open fulcruming about the spacer 44 even when the compression speed of the piston rod 4 is low before the pressure of the oil chamber 9 exceeds the set pressure of the main leaf valve 41. Hydraulic fluid then flows from the oil chamber 9 to the tank chamber 10, and a compression damping force is generated by the resistance due to this flow. The compression damping force when the compression speed of the piston rod 4 is low is determined by the deformation characteristics of the subleaf valve 42 and the opening area of the opening 41A, and a very small damping force which increases linearly is therefore generated with a fast response.

On the other hand, when the compression speed of the piston rod 4 is high and the pressure of the oil chamber 9 exceeds the set pressure of the main leaf valve 41, the main leaf valve 41 is pushed open. Therefore the damping force due to the opening 41A does not increase any further, and increase of compression damping force is a gradual increase determined by the opening area of the opening at the edge of the outer circumference of the main leaf valve 41 and the deformation characteristics of the main leaf valve 41.

Figure 5:
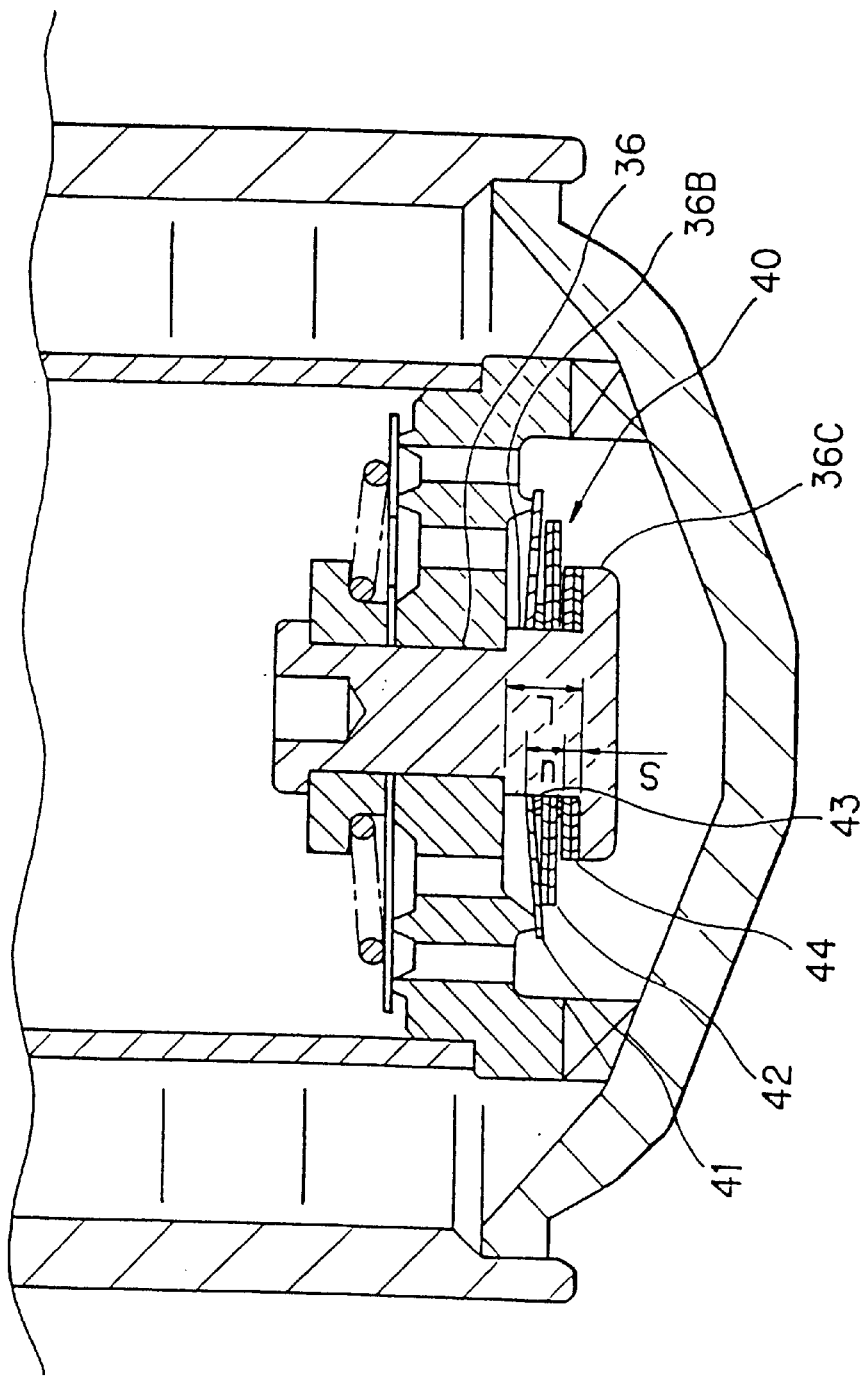
FIG. 5 is a sectional view showing an enlargement of the area around the base valve.

In order to obtain desired damping characteristics, a structure may be adopted wherein a plurality of sub-leaf valves are laminated and the number of sub-leaf valves is varied. In this case, to avoid the need to vary the length of the portion 36B of the guide 36, a plurality of the spacers 44 may be laminated as shown in FIG. 5, and the sum of the total thickness u of the valves 42 and total thickness s of the spacers 44, u+s, arranged to be constant by adjusting the number of these spacers 44 to correspond with the number of sub-leaf valves 42. As it is then unnecessary to change the length of the portion 36B, change of parts due to variation of damping force characteristics is kept to a minimum and costs are lower.

Figure 6:
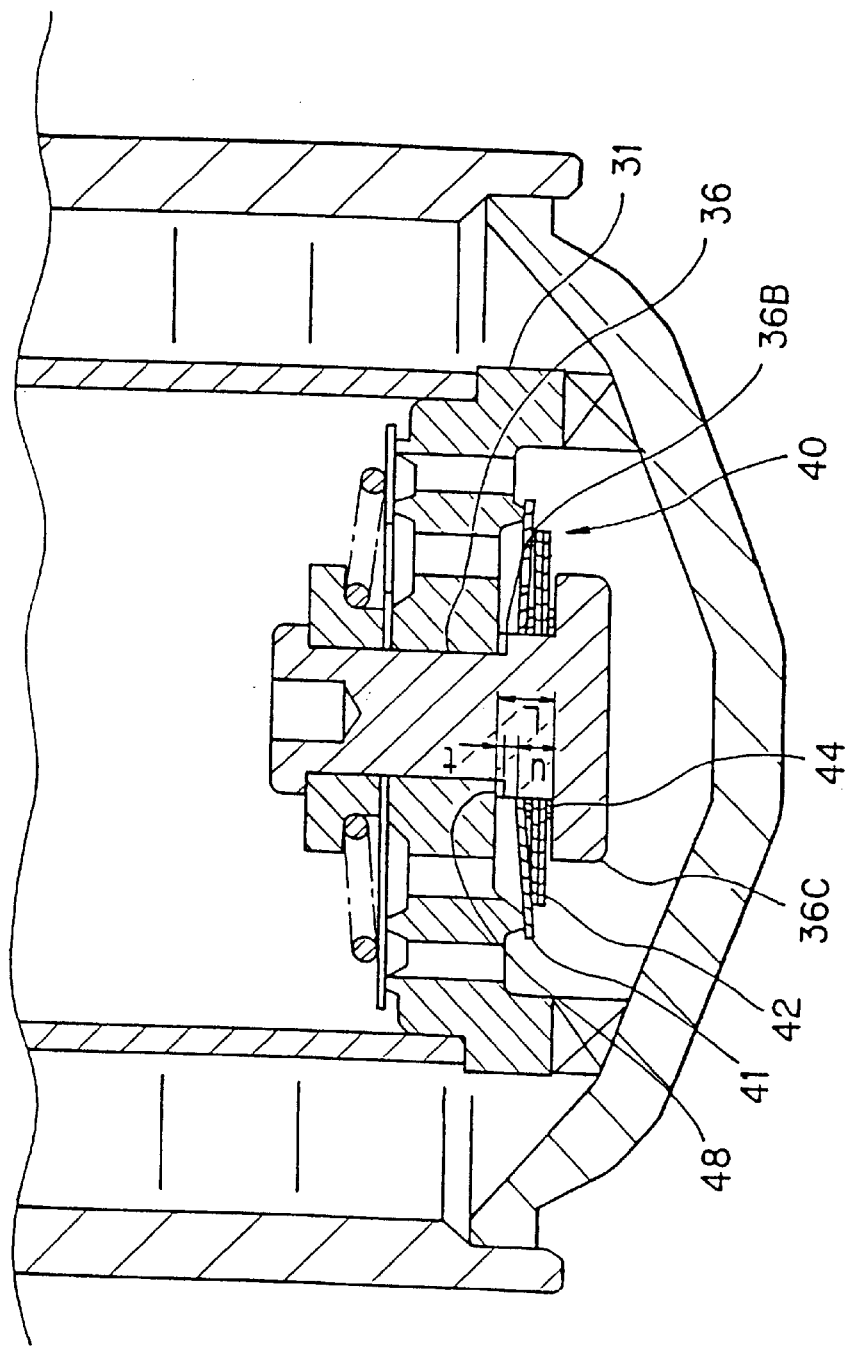
FIG. 6 is a sectional view showing an enlargement of the area around the base valve.

The need to vary the length of the portion 36B due to a change in the number of the sub-leaf valves 42 may be obviated also by interposing another spacer 48 between the upper end of the portion 36B and the underside of the valve seat 31 as shown in FIG. 6, and adjusting the total thickness t of this spacer 48 and total thickness u of the sub-leaf valves 42 so that the sum u+t is constant.

Figure 7:
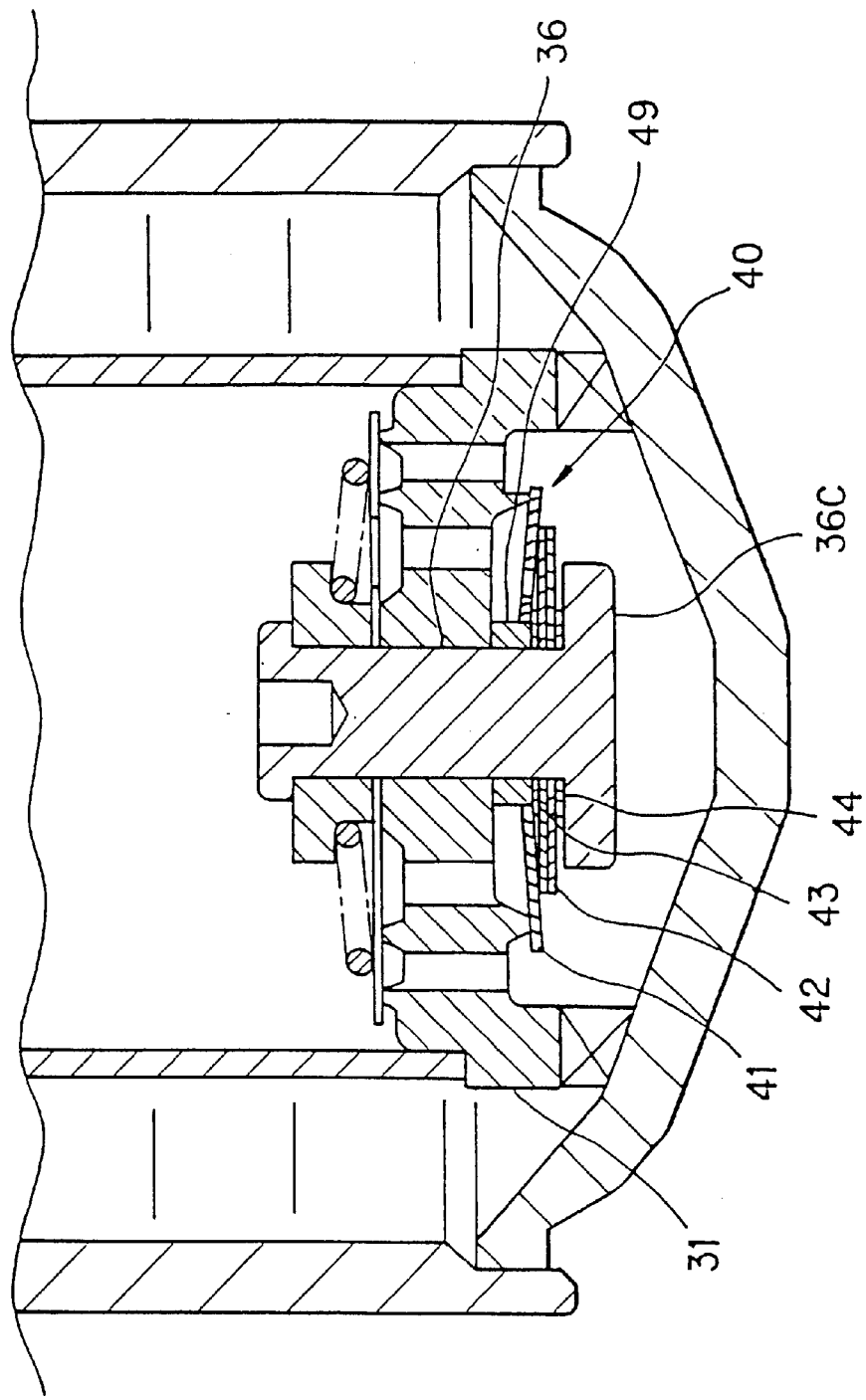
FIG. 7 is a sectional view showing an enlargement of the area around the base valve.

Alternatively, a spacer 49 may be interposed between the sub-leaf valves 42 and valve seat 31, and the main leaf valve 41 fitted to the outer circumference of this spacer 49 without forming the portion 36B of the guide 36, as shown in FIG. 7. When the number of sub-leaf valves 42 is changed, it is necessary to change only the spacer 49 without changing the guide 36. Consequently, when the damping force characteristics are changed, parts changes are kept to a minimum and costs are thereby reduced.

Next, the function of this invention will be described.

When the piston rod 4 of the hydraulic damper moves in the extension direction, hydraulic fluid flows from the oil chamber 8 to the oil chamber 9. When the extension speed of the piston rod 4 is very low or low, as hydraulic fluid pushes open only the sub-leaf valve 22 of the piston valve 20, and flows through this sub-leaf valve 22, a very small damping force which increases linearly is obtained with a fast response. When the extension speed of the piston rod 4 is higher than the medium speed, as the main leaf valve 21 is pushed open and hydraulic fluid flows through the gap between the outer circumference seat surface 14 and the outer circumferential edge portion of the main leaf valve 21, subsequent increase of pressure damping force is suppressed.

On the other hand, when the piston rod 4 of the oil pressure damper 4 moves in the compression direction, hydraulic fluid flows from the oil chamber 9 to the tank chamber 10. In this case, when the compression speed of the piston rod 4 is very low or low, hydraulic fluid pushes open only the sub-leaf valve 42 of the base valve 40, and as hydraulic fluid flows through this sub-leaf valve 42, a very small damping force which increases linearly is obtained with a fast response. When the compression speed of the piston rod 4 is higher than the medium speed, as the main leaf valve 41 is pushed open and hydraulic fluid flows through the gap between the seat surface 45 and main leaf valve 41, subsequent increase of pressure damping force is suppressed.

Further, in this compression stroke, the main leaf valve 21 of the piston valve 20 is pushed towards the port 13 due to increase of pressure in the oil chamber 9. However according to this invention, as a substantially central area is supported by the intermediate seat surface 16, the main leaf valve 21 does not bend toward the port 13. The bending stress acting on the main leaf valve 21 is therefore low, the main leaf valve 21 is not damaged, and the formation of a gap between the main leaf valve 21 and sub-leaf valve 22 is prevented.

Figure 8:
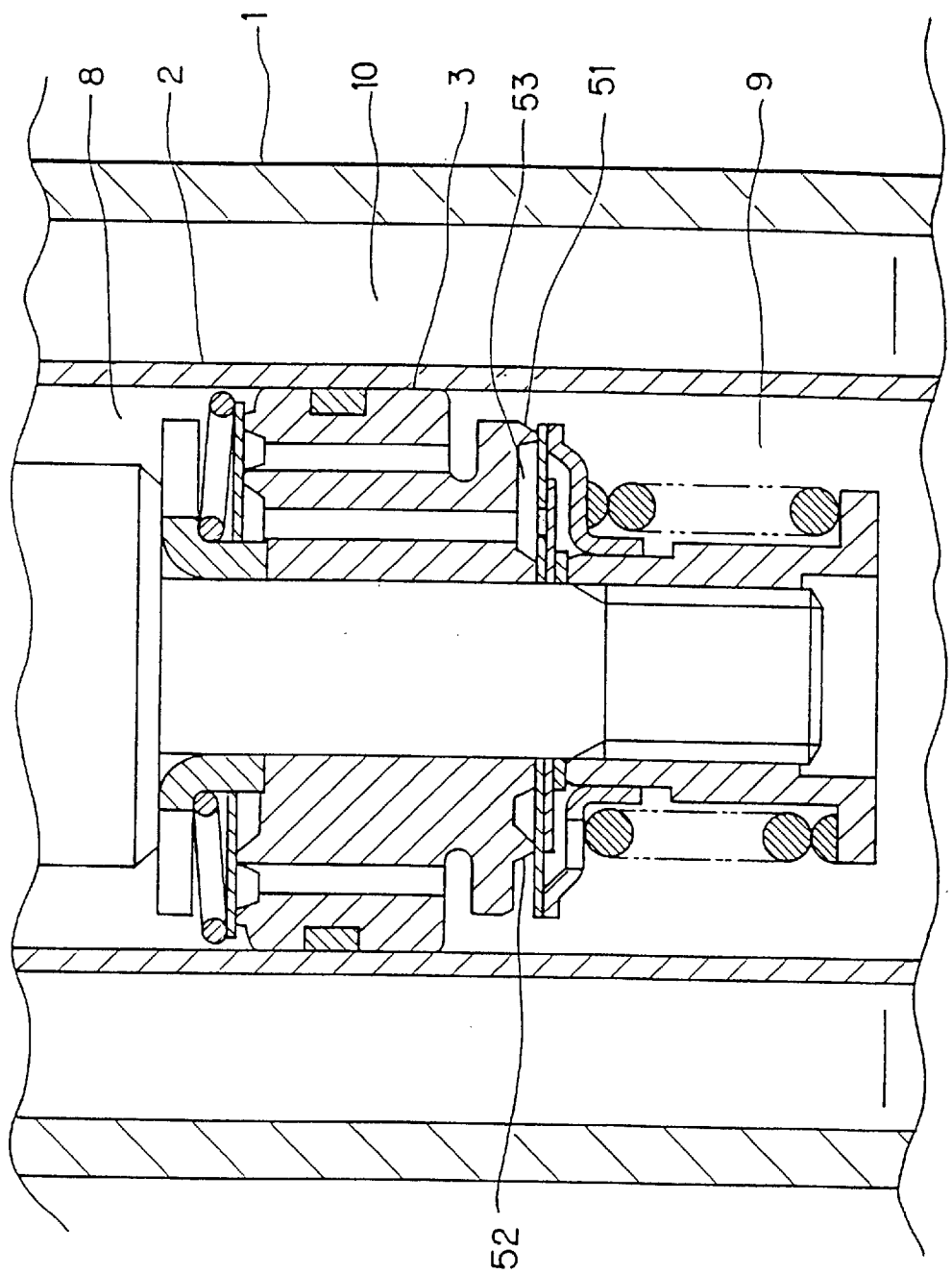
FIG. 8 is a sectional view showing another form of the invention.
Figure 9:
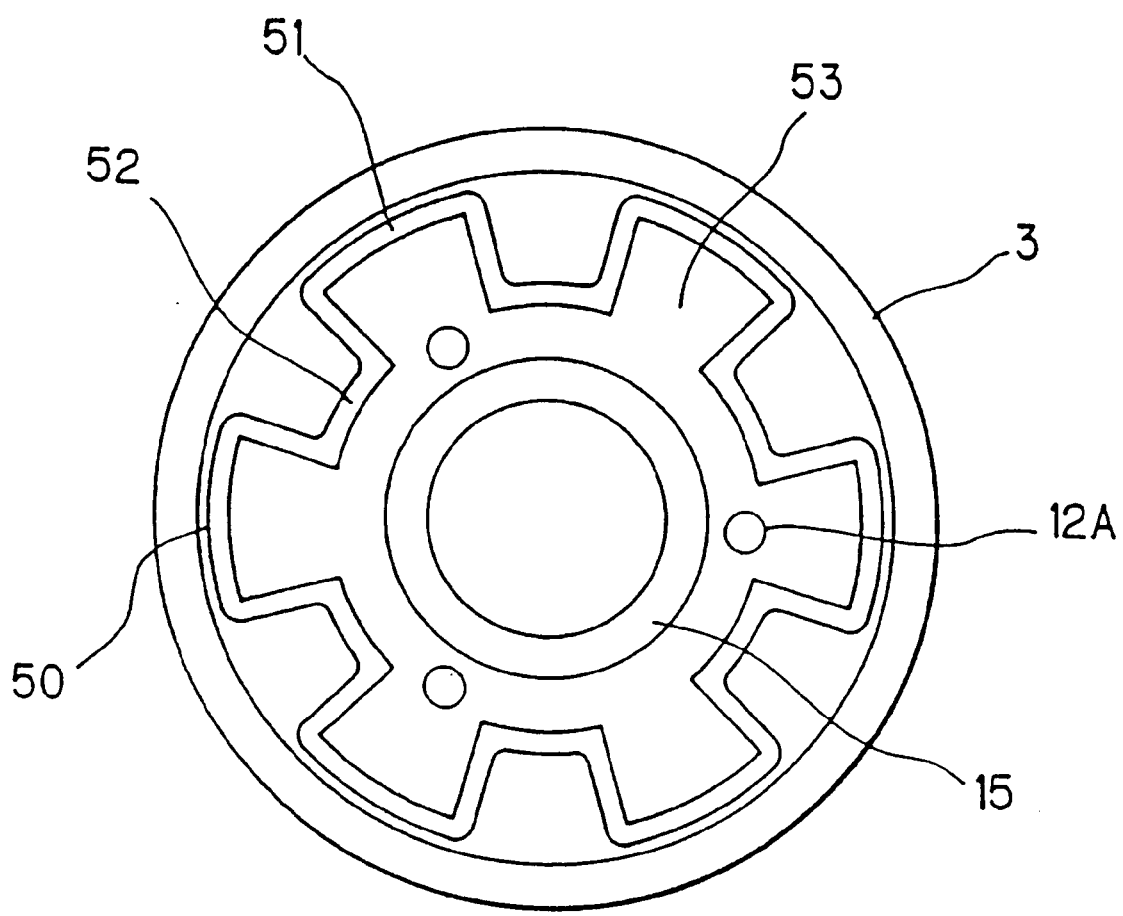
FIG. 9 is a drawing showing a piston base.

FIG. 8 and FIG. 9 show another embodiment of this invention.

According to this embodiment, only the structure of the base 3A of the piston 3 is different from that of the embodiment shown in FIG. 1–FIG. 4, and as the remaining features are the same, only the differences will be described here.

As shown in the figures, the outer seat surface has plural small diameter parts in the vicinity of an intermediate point between outer seat surface 51 and inner circumferential seat surface 13, and these small diameter parts form the intermediate seat surface 52. The outer seat surface 51 and intermediate seat surface 52 are connected so as to form one seat surface 50, and a flower shaped port 53 is formed in the gap with the inner circumferential seat surface 15. The ends 12A of the plurality of inner throughholes 12 open into the port 53.

According also to this construction, a substantially central area of the main leaf valve 21 is supported by the intermediate seat surface 52, so deformation of the main leaf valve 21 due to the pressure of the oil chamber 9 may be prevented even when the piston rod 4 moves in the compression direction.

The construction of the intermediate seat surface is not limited to the above form. The seat surface may for example have a sinusoidal, radial, cogwheel or saw shape, it being sufficient that the surface has an intermediate portion supporting the central region of the main leaf valve 21.

Figure 10:
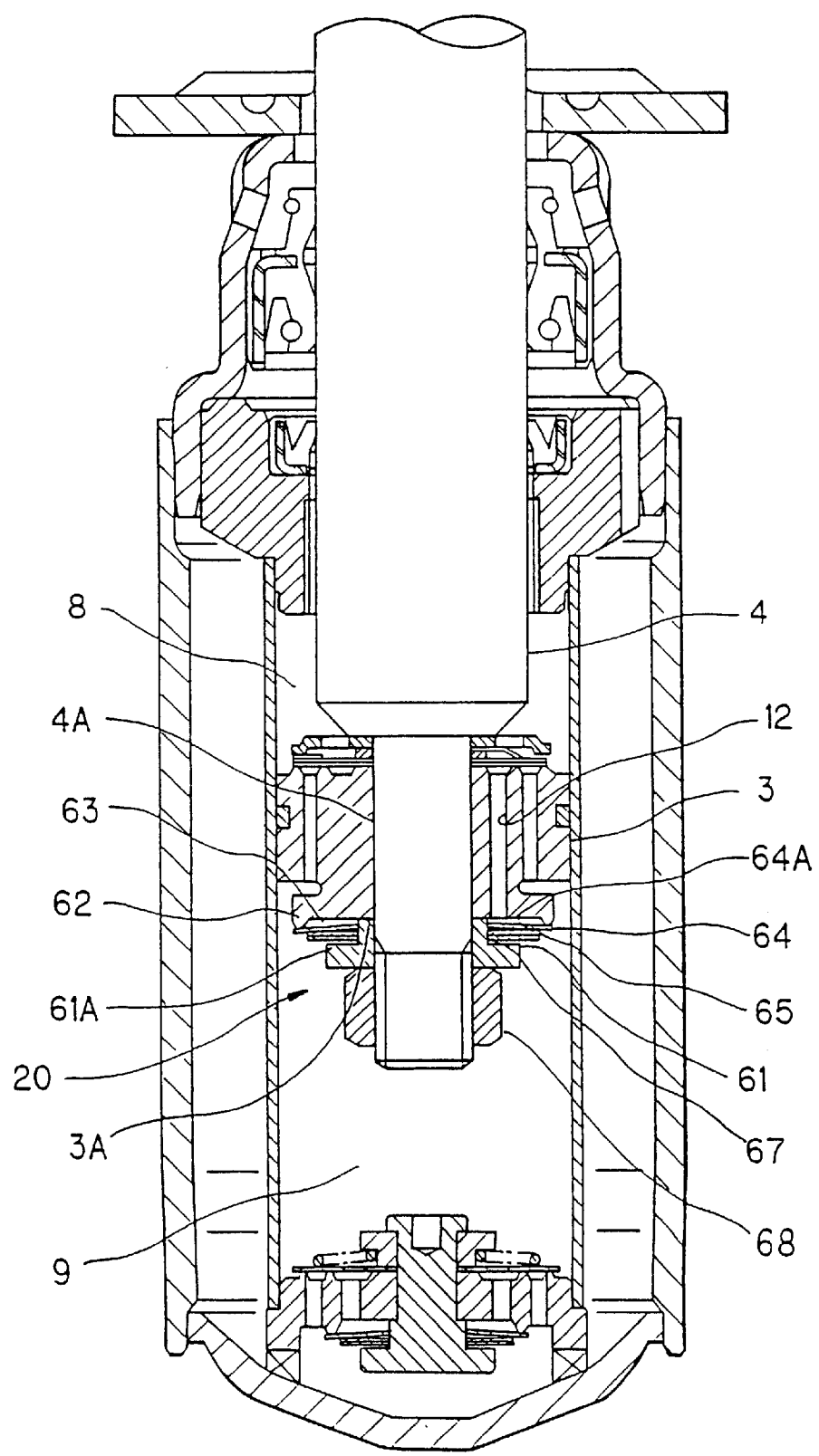
FIG. 10 is a sectional view showing another embodiment of this invention.
Figure 11:
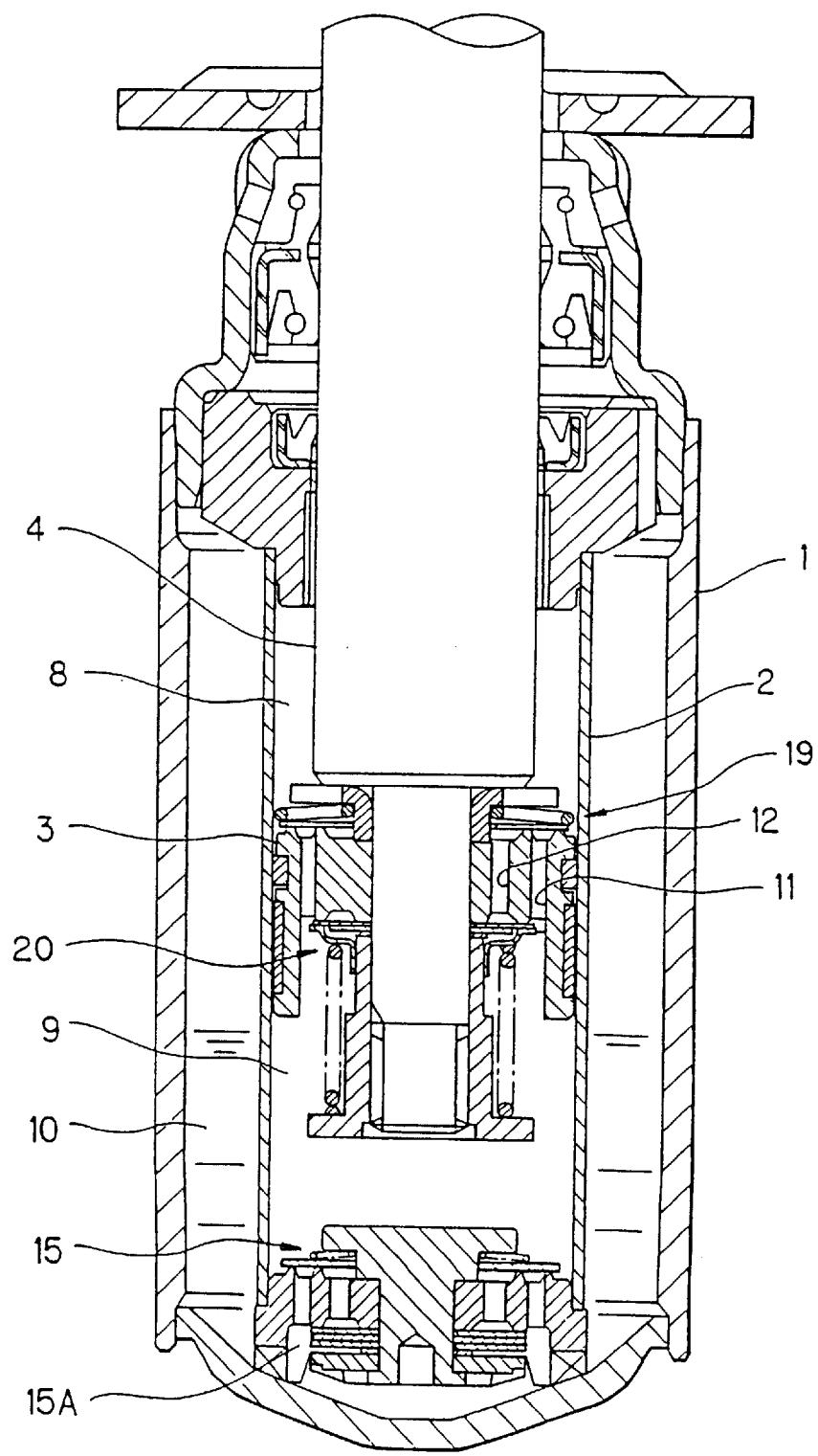
FIG. 11 is a sectional view showing the prior art.
Figure 12:
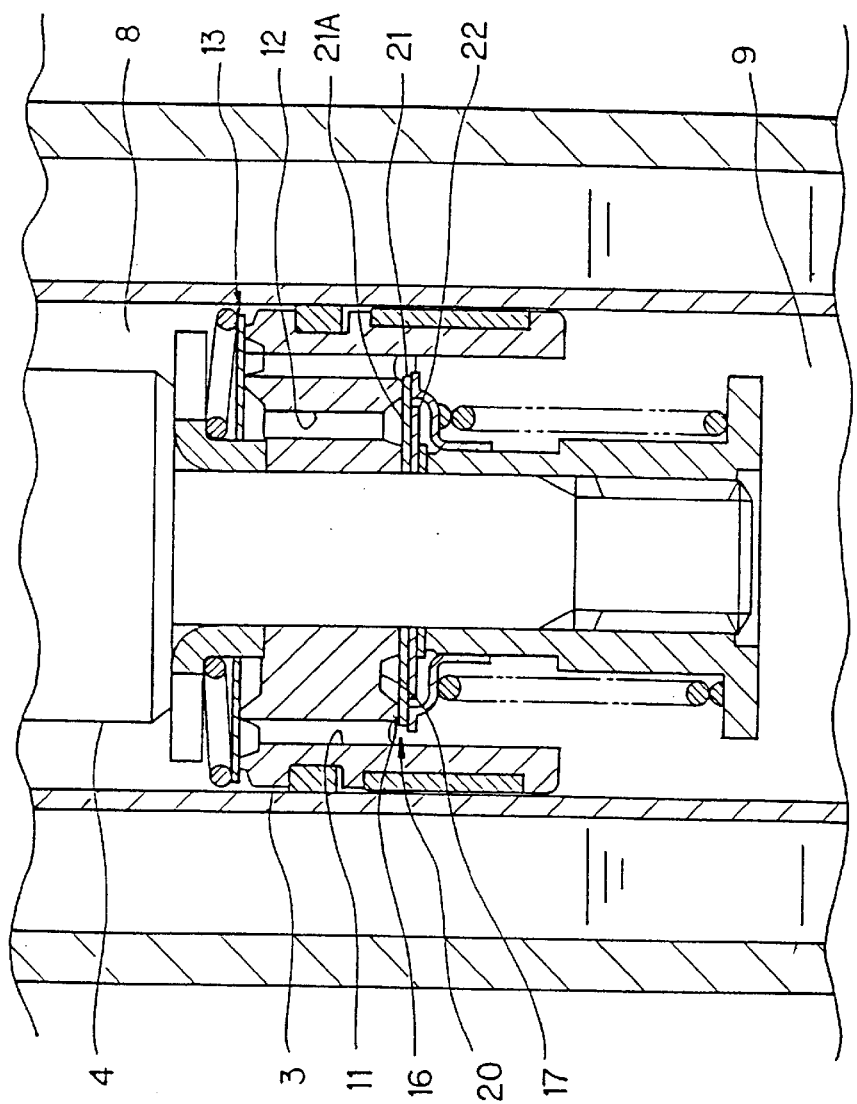
FIG. 12 is a sectional view showing the area around a piston valve of the prior art.

FIG. 10 shows yet another embodiment of this invention. According to this embodiment, only the structure of a piston valve 60 and that of the base 3A of the piston 3 are different from that of the embodiment shown in FIG. 1–FIG. 4, so this description will focus on these differences.

Specifically, a guide 61 engages with the small diameter part 4A of the piston rod 4, and the upper end of this guide 61 is brought in contact with the base 3A of the piston 3. An outer circumferential seat surface 62 is formed in this base 3A, and a port 63 is formed in the base 3A between this surface 62 and the outer circumference of the guide 61. The inner throughholes 12 are connected with this port 63.

A main leaf valve 64 engages with the outer circumference of the guide 61 below this port 63, and the outer circumferential edge of the main leaf valve 64 comes in contact with the outer circumferential seat surface 62 so as to close the port 63.

An opening 64A opens onto the main leaf valve 64, and a sub-leaf valve 65 of small diameter and low bending rigidity is laminated on the main leaf valve 64 so as to close the opening 64A from underneath. The inner circumference of this sub-leaf valve 65 engages with the guide 61, and its outer circumference extends outwards and reaches to a point where the outer circumference of the main leaf valve 64 and the outer circumferential seat surface 62 overlap.

Hence, the bending rigidity of the main leaf valve 64 is enhanced by supporting it in the vicinity of its mid-point between its outer circumference and inner circumference, the region which deforms most easily. As a result, the main leaf valve 64 does not deform toward the port 63 under the pressure of the oil chamber 9 even when the piston rod 4 is contracted.

Figure 13:
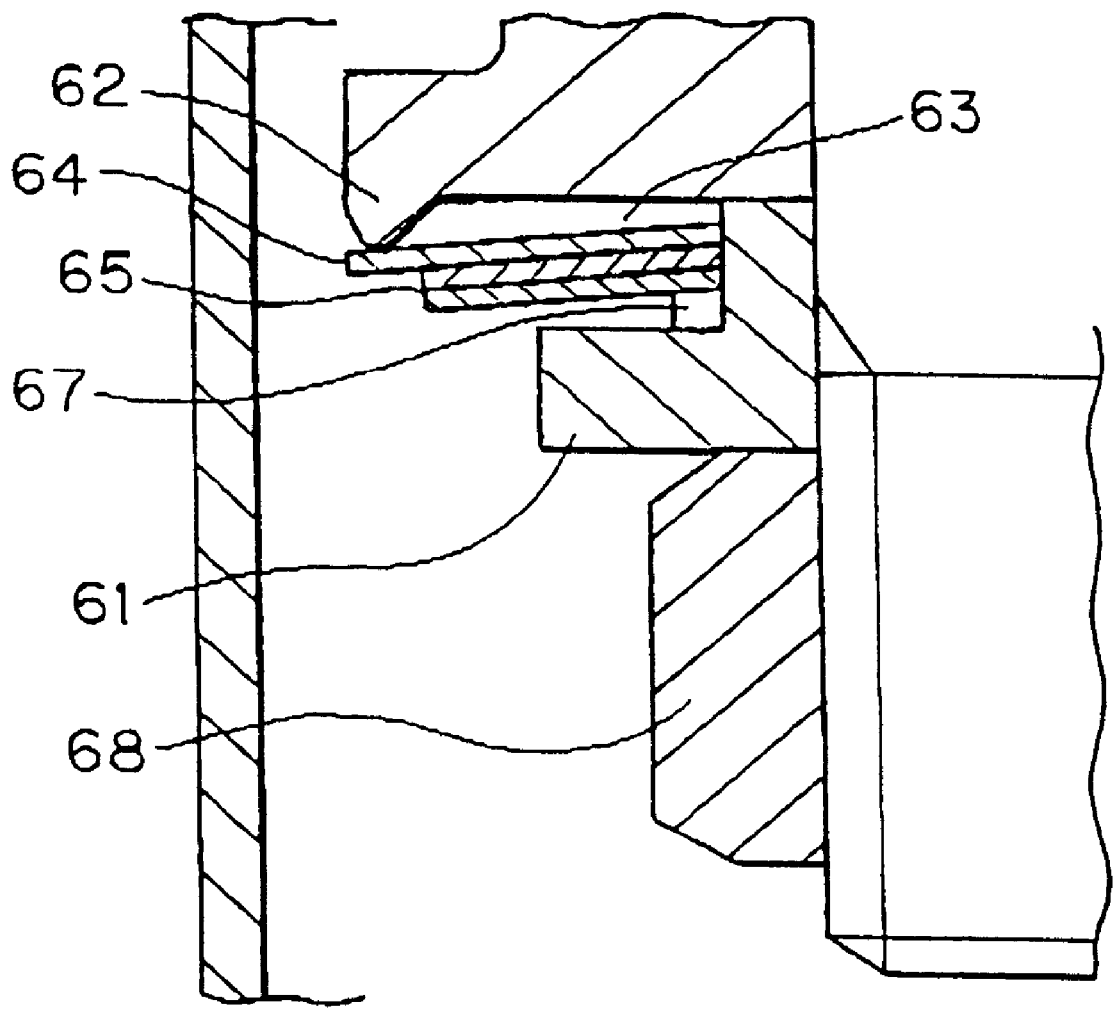
FIG. 13 is a fragmentary sectional view of FIG. 10.

As shown in FIG. 13, the underside of the sub-leaf valve 65 is also supported by a flange 61A of the guide 61 via a spacer 67. A nut 68 is screwed onto the end of the small diameter part 4A underneath this flange 61A so as to support the guide 61.

The spacer 67 pushes and shifts the inner circumference of the sub-leaf valve 65 upwards in the figure, and pushes the inner circumference of the main-leaf valve 64 into the port 63. As a result, the main-leaf valve 64 bends as shown in the figure and its outer circumference is pushed onto the outer circumferential seat surface 62. The initial load of the main-leaf valve is given by the spacer 67.

In this way, as in the case of the piston valve 20 shown in FIG. 1–FIG. 4, the piston valve 60 according to this embodiment provides suitable damping force characteristics corresponding to the extension speed of the piston rod 4. When the piston rod 4 moves in the compression direction, the sub-leaf valve 65 underneath the main leaf valve 64 shares the load even when a large oil pressure is generated by the oil chamber 9, and consequently, deformation of the main leaf valve 64 towards the port 63 is suppressed. As a result, the main leaf valve 64 is not damaged, and the formation of a gap between the main leaf valve 64 and sub-leaf valve 65 is prevented.

In addition, as the initial load of the main-leaf valve 64 is given by the spacer 67, it can be easily adjusted by changing the height of the spacer 67 or changing the number of the spacers 67. For example, in order to increase the initial load of the main leaf valve 64, the height of the spacer 67 or the number of spacers 67 may be increased.

If the initial load were given by a spring which pushes the main-leaf valve upwards (e.g., spring 26 in FIG. 2), the height of the hydraulic damper would increase as much as the height of the spring. However, by using the spacer 67 for generating the initial load, the height of the hydraulic damper can be suppressed.

INDUSTRIAL APPLICABILITY

As described hereinabove, the damping force generator in the hydraulic damper according to this invention protects the valve comprising the damping force generator, and is therefore useful in increasing its durability.

What is claimed is:

1. A damping force generator for a hydraulic damper comprising a main leaf valve and a sub-leaf valve laminated on each other, wherein said sub-leaf valve closes an opening formed in said main leaf valve and has a lower bending rigidity than that of said main leaf valve, only said sub-leaf valve opens to generate a damping force when a stroke speed of a piston rod is low, and said main leaf valve opens to suppress an increase of the damping force when the stroke speed of said piston rod is high, and said generator is characterized in that:

said generator further comprises a seat surface supporting an outer circumference of said main leaf valve, and said main-leaf valve is pushed onto said seat surface by pushing an inner circumference of said main-leaf valve to bend said main-leaf valve, the inner circumference of said main-leaf valve being pushed and shifted by a spacer which supports said sub-leaf valve, the spacer being selected to set an initial load of said main-leaf valve.

2. A damping force generator for a hydraulic damper as defined in claim 1, wherein said sub-leaf valve supports said main leaf valve at a mid-point between the inner circumference of the main leaf valve and the outer circumference of the main leaf valve.

3. A damping force generator for a hydraulic damper as defined in claim 1, wherein said sub-leaf valve supports said main leaf valve at the point where said main leaf valve deforms most easily.

4. A damping force generator for a hydraulic damper, comprising a main leaf valve and a sub-leaf valve laminated on each other, wherein said sub-leaf valve closes an opening formed in said main leaf valve and has a lower bending rigidity than that of said main leaf valve, only said sub-leaf valve opens to generate a damping force when a stroke speed of a piston rod is low, and said main leaf valve opens to suppress an increase of the damping force when the stroke speed of said piston rod is high, and said generator is characterized in that:

said generator further comprises a seat surface supporting an outer circumference of said main leaf valve, and said main-leaf valve is pushed onto said seat surface by pushing an inner circumference of said main-leaf valve to bend said main-leaf valve, wherein an outer circumference of said sub-leaf valve extends outwards and reaches a point where the outer circumference of said main leaf valve and said seat surface overlap.

\* \* \* \* \*